United States Patent
Ishioka

(10) Patent No.: US 11,906,740 B2
(45) Date of Patent: Feb. 20, 2024

(54) DISPLAY SYSTEM, PROGRAM, DISPLAY METHOD, AND HEAD MOUNTED DEVICE

(71) Applicant: Sony Interactive Entertainment Inc., Tokyo (JP)

(72) Inventor: Manabu Ishioka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 388 days.

(21) Appl. No.: 17/274,583

(22) PCT Filed: Sep. 28, 2018

(86) PCT No.: PCT/JP2018/036551
§ 371 (c)(1),
(2) Date: Mar. 9, 2021

(87) PCT Pub. No.: WO2020/059157
PCT Pub. Date: Mar. 26, 2020

(65) Prior Publication Data
US 2022/0050293 A1    Feb. 17, 2022

(30) Foreign Application Priority Data

Sep. 20, 2018 (WO) .................. PCT/JP2018/034828

(51) Int. Cl.
*G09G 5/00* (2006.01)
*G02B 27/01* (2006.01)

(52) U.S. Cl.
CPC ..... *G02B 27/0172* (2013.01); *G02B 27/0176* (2013.01); *G02B 2027/014* (2013.01); *G02B 2027/0138* (2013.01)

(58) Field of Classification Search
CPC ............ G02B 27/0172; G02B 27/0176; G02B 2027/0138; G02B 2027/014
(Continued)

(56) References Cited

U.S. PATENT DOCUMENTS

| 9,807,384 B1 | 10/2017 | Jokinen |
| 10,379,605 B2 | 8/2019 | Kurihara |

(Continued)

FOREIGN PATENT DOCUMENTS

| CN | 203786408 U | 8/2014 |
| CN | 106796354 A | 5/2017 |

(Continued)

OTHER PUBLICATIONS

The Second Office Action for corresponding CN Application No. 201880097475.3, 13 pages, dated Nov. 25, 2022.

(Continued)

*Primary Examiner* — Jonathan M Blancha
(74) *Attorney, Agent, or Firm* — Matthew B. Dernier, Esq.

(57) ABSTRACT

There is provided a display system used for a head mounted display including a head mounted device having a lens for guiding image light to an eye of a user and configured to be mounted on a head of the user and a portable terminal having an imaging unit for photographing a front of a display surface and capable of being housed in the head mounted device. The display system includes a display control section configured to display a moving image on the display surface, an image information obtaining section configured to obtain image information photographed by the imaging unit, and a position information obtaining section configured to obtain position information of an optical axis of the lens on the display surface on the basis of position information of at least two reference positions whose relative positions with respect to the optical axis are determined in advance, the at least two reference positions being included in the image information. The display control section displays the moving image in a region of the display surface according to the position information of the optical axis.

14 Claims, 12 Drawing Sheets

(58) Field of Classification Search
USPC .......................................................... 345/8
See application file for complete search history.

(56) References Cited

U.S. PATENT DOCUMENTS

| | | | |
|---|---|---|---|
| 10,460,165 B2 | 10/2019 | Wilson | |
| 10,635,901 B2 | 4/2020 | Manabu | |
| 10,672,110 B2 | 6/2020 | Takizawa | |
| 2016/0170482 A1 | 6/2016 | Yajima | |
| 2017/0122725 A1* | 5/2017 | Yeoh | H04N 13/144 |
| 2017/0139212 A1* | 5/2017 | Choi | G06F 1/163 |
| 2017/0262703 A1 | 9/2017 | Wilson | |
| 2017/0308158 A1 | 10/2017 | Kurihara | |
| 2018/0218211 A1 | 8/2018 | Manabu | |
| 2018/0247392 A1 | 8/2018 | Takizawa | |
| 2020/0143524 A1* | 5/2020 | Selstad | G06T 19/20 |
| 2021/0217147 A1* | 7/2021 | Edwin | G06T 5/006 |

FOREIGN PATENT DOCUMENTS

| | | |
|---|---|---|
| CN | 107852474 A | 3/2018 |
| CN | 108292493 A | 7/2018 |
| CN | 108307190 A | 7/2018 |
| JP | 2014107725 A | 6/2014 |
| JP | 2016081476 A | 5/2016 |
| JP | 2016163136 A | 9/2016 |
| JP | 2016181864 A | 10/2016 |
| JP | 2018097437 A | 6/2018 |
| WO | 2013128612 A1 | 9/2013 |

OTHER PUBLICATIONS

The First Office Action for corresponding CN Application No. 201880097475.3, 13 pages, dated May 5, 2022.
International Search Report for corresponding PCT Application No. PCT/JP2018/036551, 4 pages, dated Dec. 4, 2018.
International Preliminary Report on Patentability and Written Opinion for corresponding PCT Application No. PCT/JP2018/036551, 14 pages, dated Apr. 1, 2021.

* cited by examiner

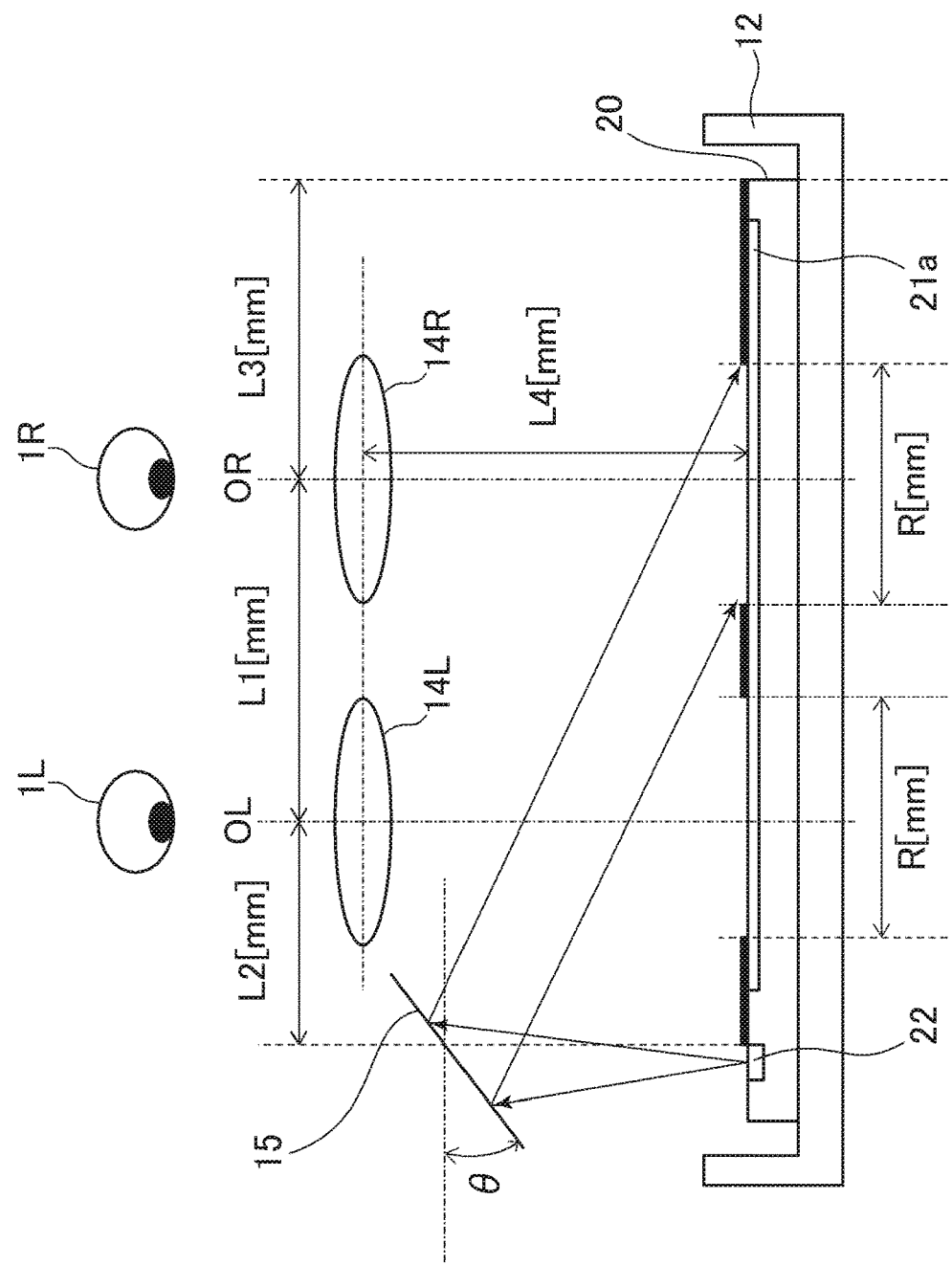
F I G . 3

DISPLAY SYSTEM, PROGRAM, DISPLAY METHOD, AND HEAD MOUNTED DEVICE

TECHNICAL FIELD

The present invention relates to a display system, a program, a display method, and a head mounted device.

BACKGROUND ART

As disclosed in PTL 1, a head mounted display is known which is formed by housing a portable terminal displaying a moving image such as a smart phone in what is generally called VR (Virtual Reality) goggles. Some such head mounted displays use a dedicated smart phone. In a head mounted display using a dedicated smart phone, a position in which the smart phone is housed is defined in advance, and therefore which region of the display surface of the smart phone is used to display a moving image is determined in advance.

CITATION LIST

Patent Literature

[PTL 1] Japanese Patent Laid-Open No. 2016-081476

SUMMARY

Technical Problem

The size of the terminal, the size of the display surface, and the like are various depending on the kind of the smart phone. There is a desire for a head mounted display to which not only the dedicated smart phone but also various kinds of smart phones can be applied.

The present invention has been made in view of the above problem. It is an object of the present invention to provide a display system, a program, a display method, and a head mounted device that can display a moving image in a region of a display surface according to performance of a portable terminal.

Solution to Problem

An example of a display system proposed in the present disclosure is a display system used for a head mounted display including a head mounted device having an optical system for guiding image light to an eye of a user and configured to be mounted on a head of the user and a portable terminal having an imaging unit for photographing a front of a display surface and capable of being housed in the head mounted device. The display system includes a display control section configured to display a moving image on the display surface, an image information obtaining section configured to obtain image information photographed by the imaging unit, and a position information obtaining section configured to obtain position information of an optical axis of the optical system on the display surface on a basis of position information of at least two reference positions whose relative positions with respect to the optical axis are determined in advance, the at least two reference positions being included in the image information. The display control section displays the moving image in a region of the display surface according to the position information of the optical axis.

In addition, an example of a program proposed in the present disclosure is a program used in a display system used for a head mounted display including a head mounted device having an optical system for guiding image light to an eye of a user and configured to be mounted on a head of the user and a portable terminal having an imaging unit for photographing a front of a display surface and capable of being housed in the head mounted device. The program makes a computer function as image information obtaining means for obtaining image information photographed by the imaging unit, and position information obtaining means for obtaining position information of an optical axis of the optical system on the display surface on a basis of position information of at least two reference positions whose relative positions with respect to the optical axis are determined in advance, the at least two reference positions being included in the image information.

In addition, an example of a display method proposed in the present disclosure includes by a computer, displaying a moving image on a display surface, obtaining image information photographed by an imaging unit for photographing a front of the display surface, obtaining position information of an optical axis of an optical system on the display surface, the optical system being included in a head mounted device configured to be mounted on a head of a user, and the optical system guiding image light of the moving image to an eye of the user, on a basis of position information of at least two reference positions whose relative positions with respect to the optical axis are determined in advance, the at least two reference positions being included in the image information, and displaying the moving image in a region of the display surface according to the position information of the optical axis.

In addition, an example of a head mounted device proposed in the present disclosure include: a mounting band configured to be mounted on a head of a user, a housing portion configured to house a portable terminal having an imaging unit for photographing a front side of a display surface displaying a moving image, an optical system configured to guide image light emitted from the display surface to an eye of the user, and at least one reflecting mirror configured to reflect the image light to the imaging unit.

According to the display system, the program, the display method, and the head mounted device described above, it is possible to display a moving image in a region of a display surface according to performance of a portable terminal.

BRIEF DESCRIPTION OF DRAWINGS

FIG. 3 is a schematic diagram schematically illustrating an example of a mounted state of the head mounted display according to the present embodiment.

DESCRIPTION OF EMBODIMENT

An embodiment of the present invention (hereinafter, referred to as the present embodiment) will hereinafter be described in detail with reference to the drawings.

[Configuration of Head Mounted Display 100]

Figure 1:
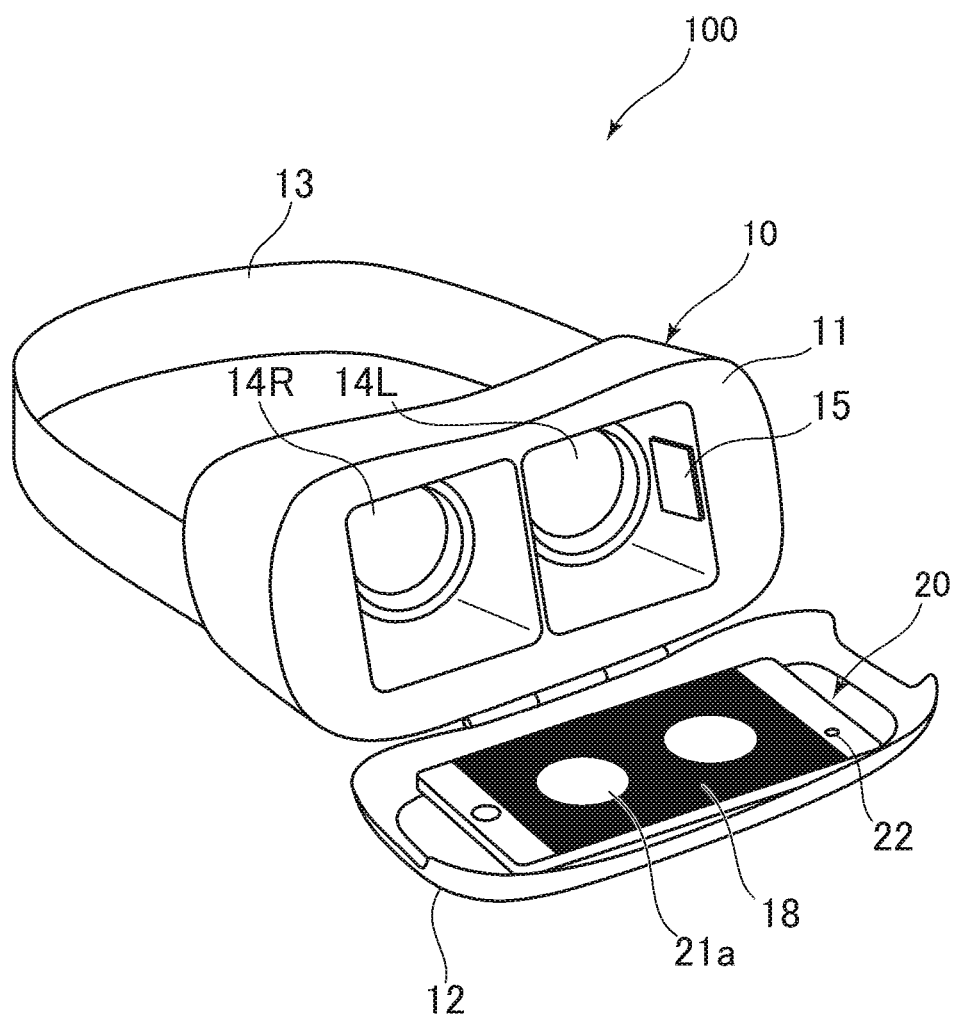
FIG. 1 is a perspective view illustrating an example of a head mounted display according to a present embodiment.

FIG. 1 is a perspective view illustrating an example of a head mounted display according to the present embodiment. In the present embodiment, the head mounted display (hereinafter, referred to also as an HMD (Head Mounted Display)) 100 includes a smart phone 20 as a portable terminal and a head mounted device 10 that is mounted on the head of a user and disposes a display unit 21 of the smart phone 20 in front of the eyes of the user.

As illustrated in FIG. 1, the head mounted device 10 includes a casing 11, a front cover 12, and a mounting band 13.

The casing 11 is provided with lenses 14R and 14L as an optical system that guides image light to pupils of the user.

The front cover 12 functions as a housing portion that houses the portable terminal 20 within the head mounted device 10. The front cover 12 is coupled to the casing 11 by a hinge or the like so as to be movable between an open position in which the front cover 12 is opened to house the portable terminal 20 within the head mounted device 10 (see FIG. 1) and a closed position in which a display surface 21a of the portable terminal 20 is disposed at a position of facing the lenses 14R and 14L. Incidentally, though not illustrated in the figure, the front cover 12 may, for example, be provided with a leaf spring or the like that presses the portable terminal 20 so as to fix the position of the portable terminal 20 within the head mounted device 10.

The mounting band 13 is preferably an annular band to be mounted on the head of the user.

In addition, as illustrated in FIG. 1, the head mounted device 10 in the present embodiment includes a reflecting mirror 15. The reflecting mirror 15 is preferably disposed in a photographing range of an imaging unit 22 included in the portable terminal 20 in a state in which the portable terminal 20 is housed within the head mounted device 10.

In addition, as illustrated in FIG. 1, the head mounted device 10 in the present embodiment includes a mask 18 as a covering member. Details of a configuration of the mask 18 will be described later with reference to FIG. 4 and the like.

Figure 2:
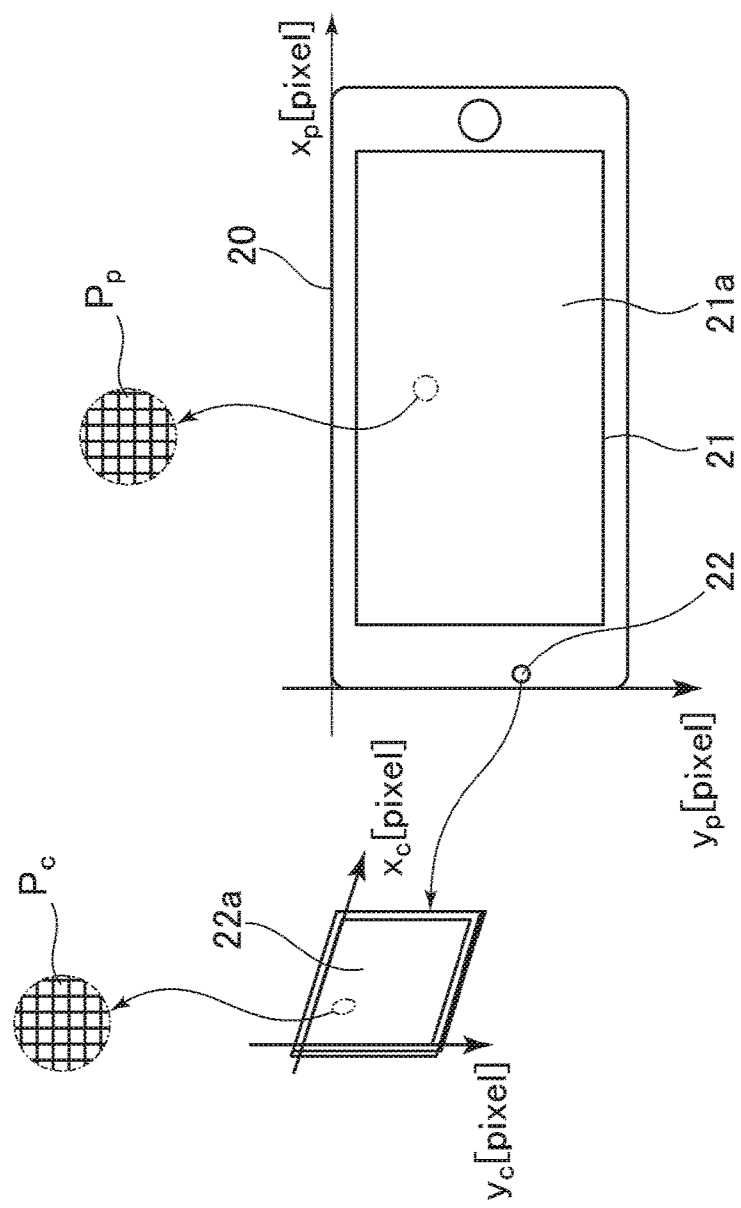
FIG. 2 is a diagram illustrating an example of a portable terminal in the present embodiment.

FIG. 2 is a diagram illustrating an example of the portable terminal in the present embodiment. Incidentally, enlarged views of pixels $P_p$ in the display surface 21a of the display unit 21 and pixels $P_c$ in a light receiving surface 22a of an imaging element are respectively illustrated within circles indicated by alternate long and short dashed lines in FIG. 2.

The portable terminal 20 is a computer operated by the user. The portable terminal 20 has the display surface 21a that displays a still image and a moving image. The planar shape of the display surface 21a is a substantially rectangular shape, and a plurality of pixels $P_p$ are provided thereto so as to be arranged in a matrix form. In the present embodiment, as illustrated in FIG. 2, a longitudinal direction of the display surface 21a is set as an $x_p$ axis, and a direction orthogonal to the longitudinal direction of the display surface 21a is set as a $y_p$ axis. In the following, this coordinate system will be referred to as a display coordinate system and will be in units of pixels.

The display unit 21 preferably displays each of a parallax image for the left eye of the user and a parallax image for the right eye of the user on the display surface 21a. Incidentally, the parallax images are images for displaying stereoscopic video according to the parallax of the left and right eyes. Incidentally, the display unit 21 is preferably a display such, for example, as a liquid crystal display device or an organic electroluminescence display device. However, the kind of the display unit 21 is not particularly limited.

In addition, the imaging element constituting the imaging unit 22 is included in a frame region on the periphery of the display surface 21a in the portable terminal 20. FIG. 2 schematically illustrates an enlarged view of the imaging element at the head of an arrow of a leader line drawn out from the imaging unit 22. The imaging unit 22 is preferably what is generally called selfie camera that photographs the front of the display surface 21a.

A plurality of pixels $P_c$ are provided to the light receiving surface 22a of the imaging element so as to be arranged in a matrix form. In the present embodiment, as illustrated in FIG. 2, a direction parallel with the $x_p$ axis of the display coordinate system on the light receiving surface 22a is set as an $x_c$ axis, and a direction parallel with the $y_p$ axis of the display coordinate system is set as a $y_c$ axis. In the following, this coordinate system will be referred to as an imaging coordinate system and will be in units of pixels.

The imaging unit 22 obtains an image by outputting a signal of a strength corresponding to an amount of light received by each pixel $P_c$ provided to the light receiving surface 22a. The imaging unit 22 is preferably, for example, a CCD (Charge-Coupled Device) image sensor, a CMOS (Complementary Metal-Oxide Semiconductor) image sensor, or the like.

Incidentally, while a smart phone is illustrated as the portable terminal 20 in the present embodiment, there is no limitation to this. It suffices for the portable terminal 20 to be a portable terminal that can be housed in the head mounted device 10 and includes at least the display unit 21 including the display surface 21a displaying a moving image and the imaging unit 22 capable of photographing the front of the display surface 21a.

FIG. 3 is a schematic diagram schematically illustrating an example of a mounted state of the head mounted display according to the present embodiment. FIG. 3 illustrates the configuration of the HMD 100 when the head mounted device 10 housing the portable terminal 20 and mounted on the head of the user is viewed from below the user as well as a left eye 1L and a right eye 1R of the user. Incidentally, in the following description, a state in which the portable terminal 20 is housed in the head mounted device 10 and the front cover 12 is in the closed position will be referred to as a housed state, and a state in which the HMD 100 in the housed state is mounted on the head of the user will be referred to as a mounted state.

In the present embodiment, while the relative position of the portable terminal 20 with respect to configurations of the head mounted device 10 depends on a size, a housing position, and the like of the housed portable terminal 20, the relative positions of the configurations of the head mounted device 10 are each determined in advance and fixed. Details thereof will be described in the following.

As illustrated in FIG. 3, in the mounted state, a lens 14L is disposed in a position of facing the left eye 1L of the user, and a lens 14R is disposed in a position of facing the right eye 1R of the user.

In addition, in the housed state in the present embodiment, the display surface 21a is covered by the mask 18 as a covering member. Incidentally, the mask 18 is preferably disposed so as not to cover the imaging unit 22. Alternatively, the mask 18 may be of a shape having an opening in a region superposed on the imaging unit 22.

Figure 4:
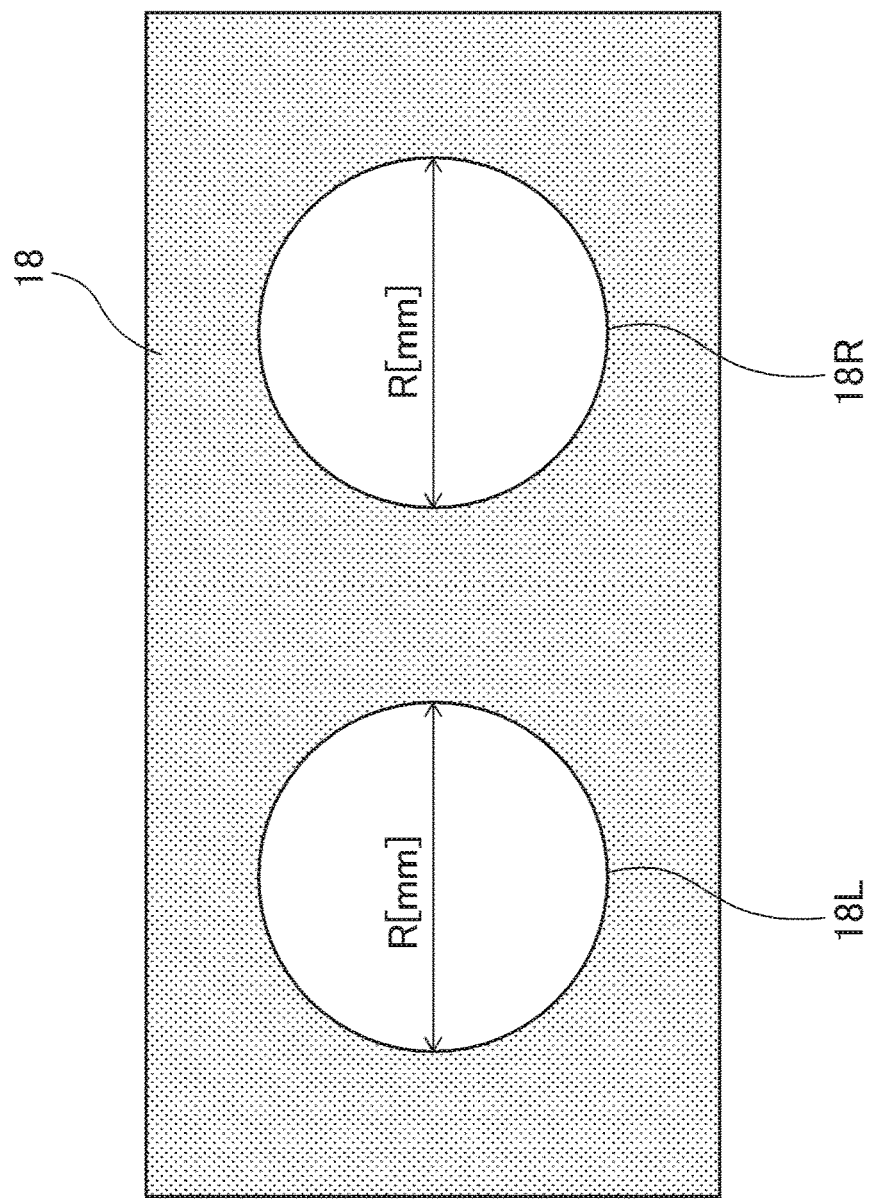
FIG. 4 is a plan view illustrating an example of a mask according to the present embodiment.

As illustrated in FIG. 4, the mask 18 has a rectangular external shape, and has openings 18L and 18R that expose the display surface 21a. In the present embodiment, the opening 18L and the opening 18R are formed in the shape of a perfect circle having a diameter R. The user views a moving image displayed on the display surface 21a via the opening 18L and the opening 18R.

The mask 18 is disposed such that the center of the opening 18L is present on an optical axis OL of the lens 14L and the center of the opening 18R is present on an optical axis OR of the lens 14R. The relative positions of the openings 18L and 18R of the mask 18 with respect to the optical axes OL and OR of the lenses 14L and 14R are thus determined in advance. Incidentally, the optical axes are imaginary light rays representing light beams passing through the whole of optical systems in the optical systems and are the centers of the lenses 14L and 14R in the present embodiment.

Incidentally, while means for fixing the position of the mask 18 is not illustrated, one end of the mask 18 is preferably fixed to the front cover 12, for example.

In addition, as illustrated in FIG. 3, a length L1 between the optical axis OL of the lens 14L and the optical axis OR of the lens 14R is determined in advance and is fixed. In addition, a length L2 between the center of the opening 18L of the mask 18 and one outer edge of the mask 18 is determined in advance and is fixed. In addition, a length L3 between the center of the opening 18L of the mask 18 and another outer edge of the mask 18 is determined in advance and is fixed.

In addition, as illustrated in FIG. 3, a length L4 from the lens 14L and the lens 14R to the back surface of the mask 18 is determined in advance and is fixed. Incidentally, the length L4 corresponds to a length from the lenses 14L and 14R to the display surface 21a of the portable terminal 20 housed within the head mounted device 10.

In addition, the reflecting mirror 15 in the housed state is disposed so as to be inclined at a predetermined angle with respect to the display surface 21a of the portable terminal 20. An angle of inclination θ of the reflecting mirror 15 is preferably an angle at which the image light emitted from the display surface 21a is reflected to the imaging unit 22. In other words, the reflecting mirror 15 is preferably disposed such that the display surface 21a is included in the photographing range of the imaging unit 22 via the reflecting mirror 15. Incidentally, while FIG. 1 illustrates an example in which the reflecting mirror 15 is disposed on an inner wall of the casing 11 which inner wall is in a vicinity of the lens 14L, there is no limitation to this. In a case where the imaging unit 22 of the portable terminal 20 is disposed on the lens 14R side, the reflecting mirror 15 may be disposed on an inner wall of the casing 11 which inner wall is in a vicinity of the lens 14R. In addition, while an example in which one reflecting mirror 15 is provided is illustrated in the present embodiment, there is no limitation to this. A plurality of reflecting mirrors may be provided. Then, the display surface 21a may be included in the photographing range of the imaging unit 22 via those plurality of reflecting mirrors. In addition, the angle of inclination θ of the reflecting mirror 15 with respect to the display surface 21a may be fixed or may be variable.

[Display Control]

Figure 5:
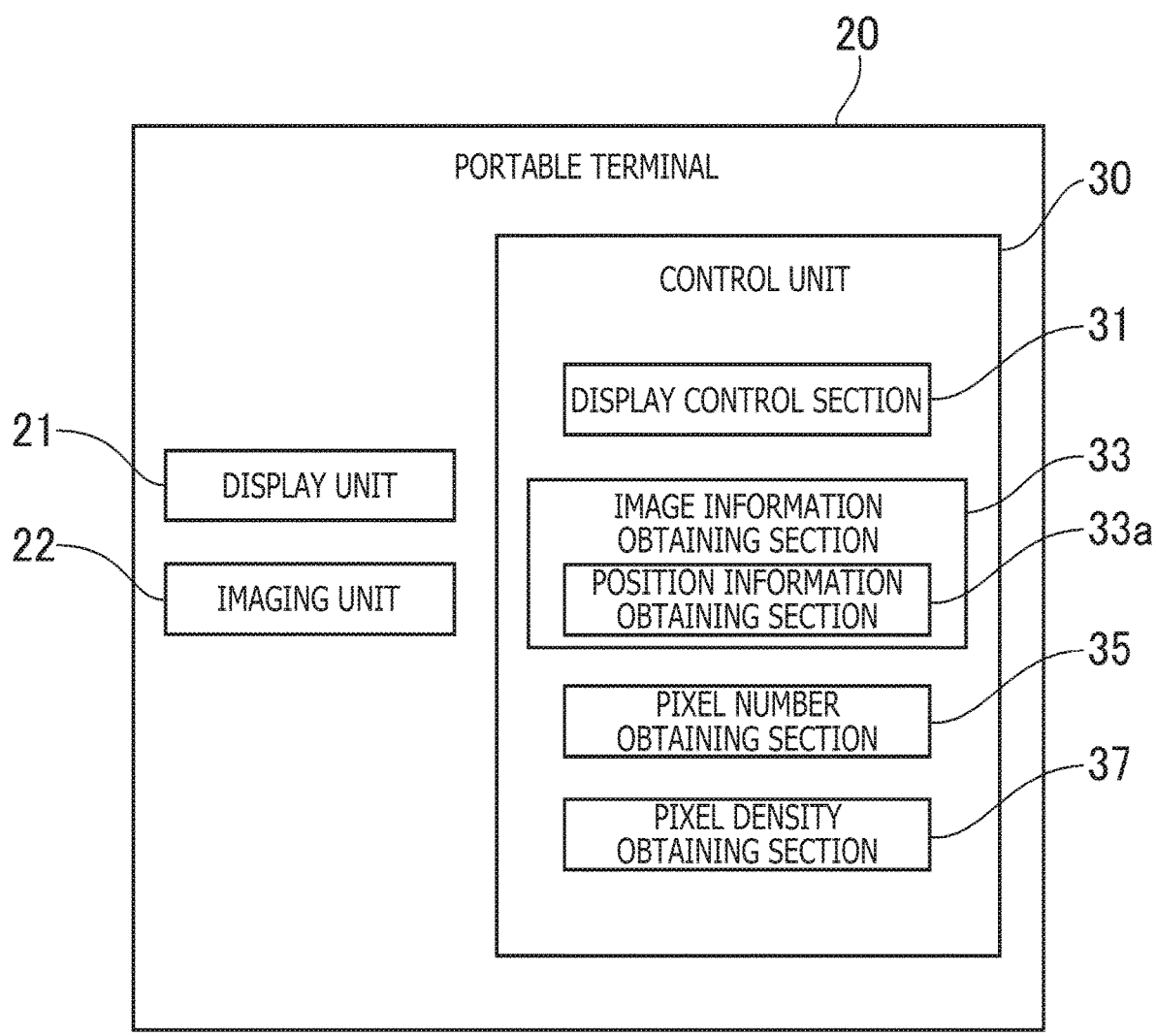
FIG. 5 is a block diagram illustrating a system configuration of the portable terminal in the present embodiment.
Figure 6:
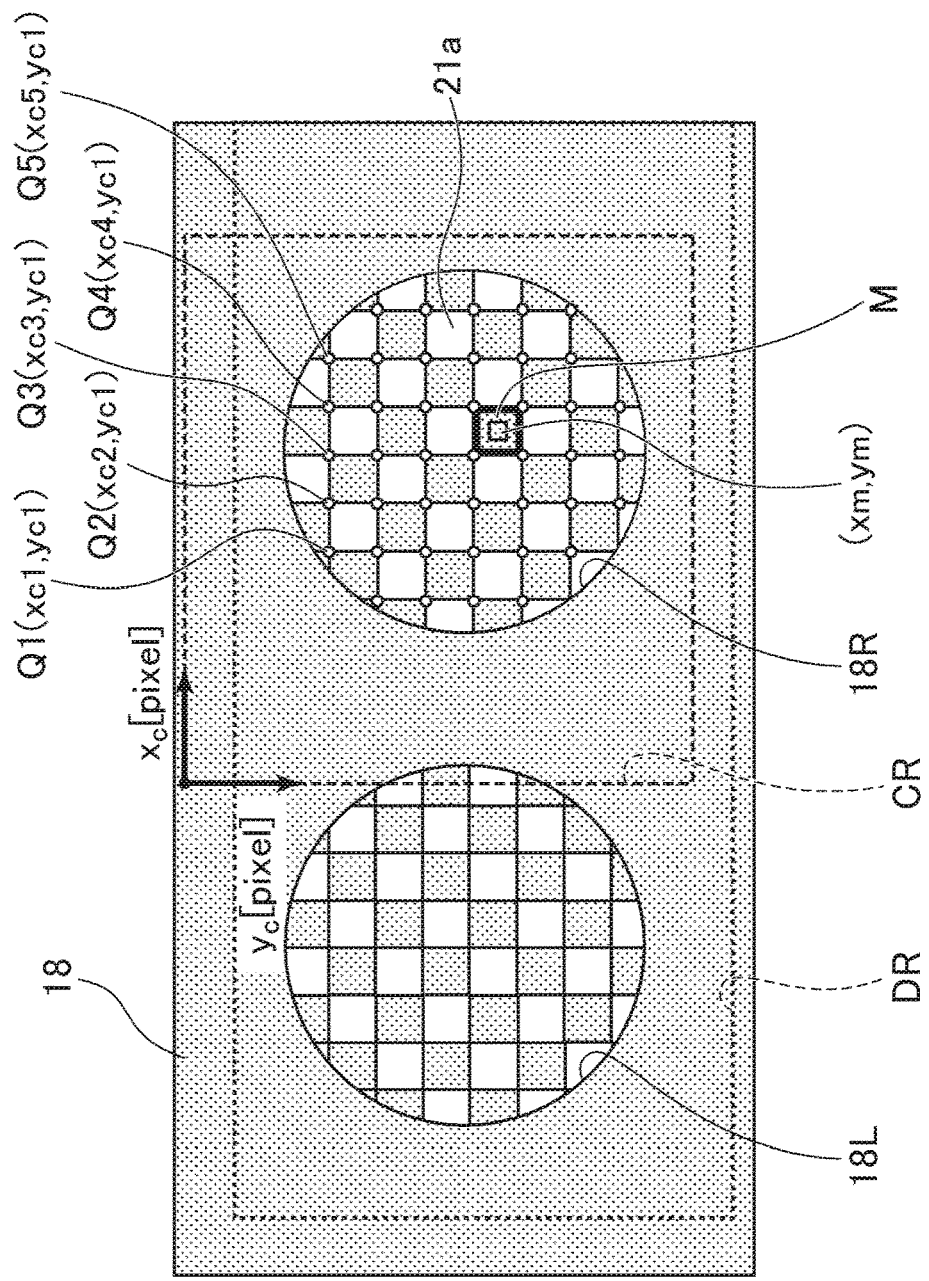
FIG. 6 is a diagram of assistance in explaining obtainment of position information in an imaging coordinate system according to the present embodiment.
Figure 7:
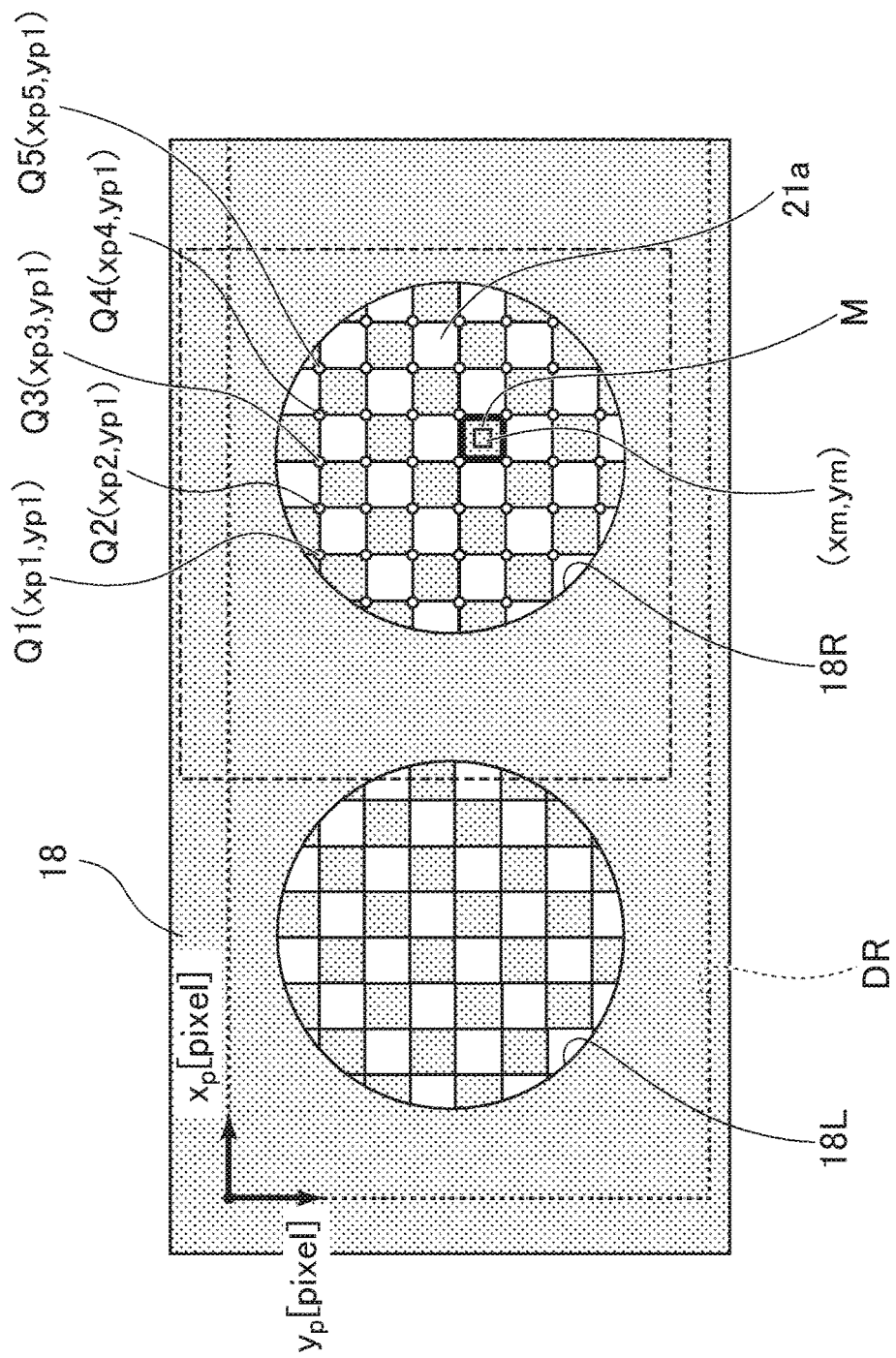
FIG. 7 is a diagram of assistance in explaining obtainment of position information in a display coordinate system according to the present embodiment.
Figure 8:
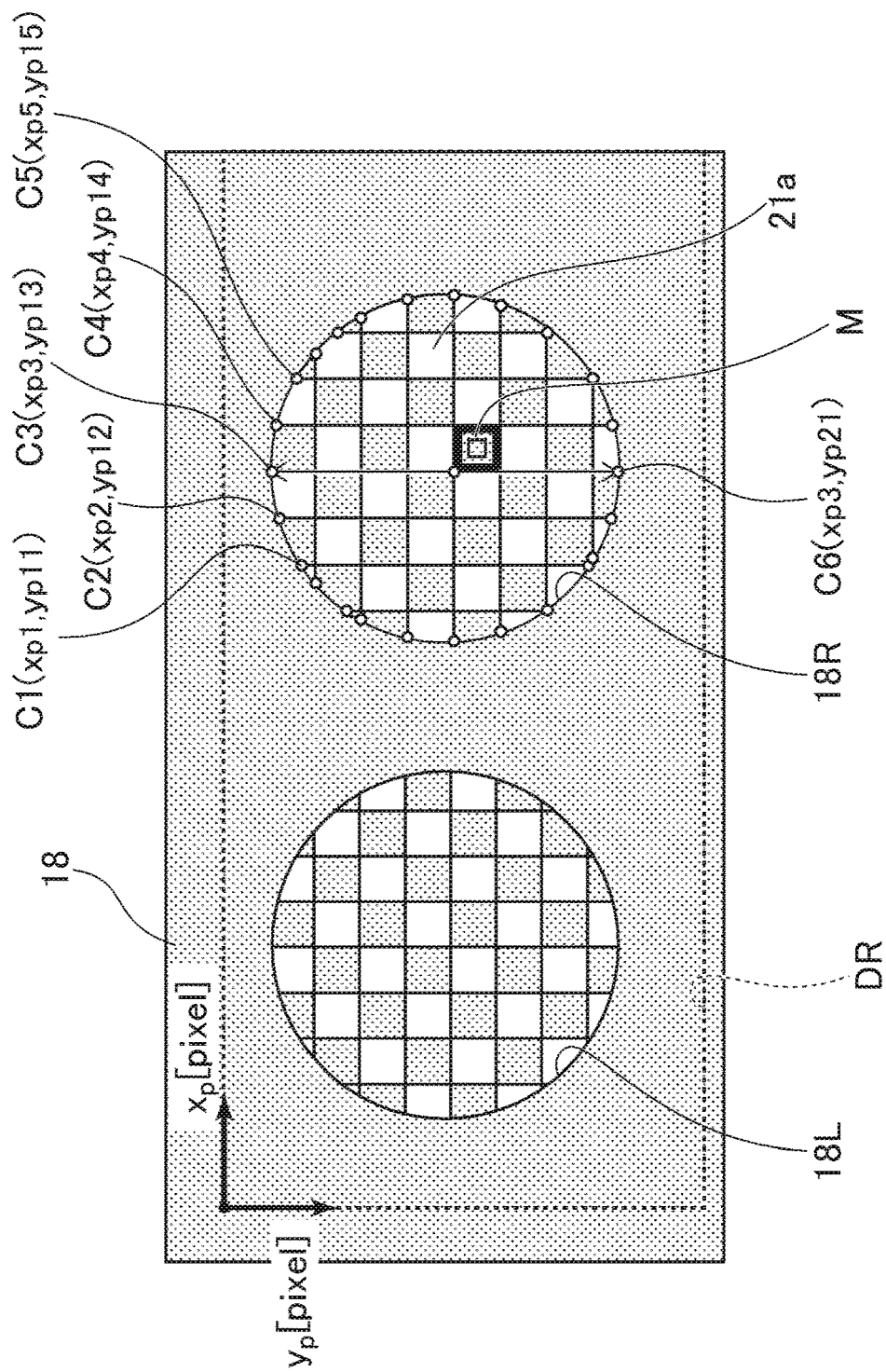
FIG. 8 is a diagram of assistance in explaining obtainment of position information of an optical axis of a lens in the display coordinate system according to the present embodiment.

Display control in the present embodiment will be described in the following with reference to FIGS. 5 to 8. FIG. 5 is a block diagram illustrating a system configuration of the portable terminal in the present embodiment. FIG. 6 is a diagram of assistance in explaining obtainment of position information in the imaging coordinate system according to the present embodiment. FIG. 7 is a diagram of assistance in explaining obtainment of position information in the display coordinate system according to the present embodiment. FIG. 8 is a diagram of assistance in explaining obtainment of position information of an optical axis of a lens in the display coordinate system according to the present embodiment. Incidentally, FIGS. 6 to 8 illustrate the mask 18 and the display surface 21a exposed from the openings 18L and 18R of the mask 18. In addition, outlined dots illustrated on the display surface 21a represent coordinates whose position information is obtained by a position information obtaining section 33a.

The performance of the portable terminal housed in the head mounted device 10 is various. Incidentally, here, the performance of the portable terminal includes the size of the portable terminal, the size of the display surface, the pixel density of the display surface, and the like. In the housed state, the positions of the optical axes OL and OR of the lenses 14L and 14R of the head mounted device 10 on the display surface of the portable terminal depend on the size and housing position of the portable terminal. In addition, the display region and display size of a moving image depend on the pixel density of the display surface of the portable terminal. The HMD 100 according to the present embodiment displays a moving image of an appropriate size in an appropriate position and region of the display surface according to the performance of the portable terminal housed in the head mounted device 10.

As illustrated in FIG. 5, the portable terminal 20 includes a control unit 30 that makes the portable terminal 20 operate as a computer by executing a program stored in a memory. The control unit 30 includes a display control section 31 that displays a still image and a moving image on the display surface 21a, an image information obtaining section 33 that obtains image information photographed by the imaging unit 22, a pixel number obtaining section 35 that obtains the number of pixels of the display surface 21a, and a pixel density obtaining section 37 that obtains the pixel density of the display surface 21a. In addition, the image information obtaining section 33 includes a position information obtaining section 33a that obtains position information in the imaging coordinate system and position information in the display coordinate system.

Incidentally, the display control section 31, the image information obtaining section 33, the pixel number obtaining section 35, and the pixel density obtaining section 37 are preferably, for example, stored by installing an application program downloaded from the Internet or the like in the memory included in the portable terminal 20.

The control unit 30 obtains, in advance, information regarding the relative position of each configuration included in the head mounted device 10 and stores the information in the memory or the like. Specifically, the control unit 30 preferably stores, in advance, at least the diameter R [mm] of the openings 18L and 18R formed in the mask 18 and the length L1 [mm] between the optical axis OL and the optical axis OR.

As illustrated in FIG. 6 and the like, the display control section 31 displays a still image illustrating a lattice-shaped pattern on the display surface 21a. In addition, in the present embodiment, as illustrated in FIG. 6 and the like, the display control section 31 displays a mark M within the lattice-shaped pattern. The mark M is preferably displayed in a form that the image information obtaining section 33 can distinguish from each lattice cell constituting the lattice-shaped pattern, that is, in a shape different from each lattice cell or the like. In addition, the mark M is preferably displayed in a region of the display surface 21a in which region at least a part of the moving image is estimated to be displayed. That is, the display control section 31 preferably displays the still image in such a manner as to display the mark M in a region of the display surface 21a which region is exposed from the opening 18R in the housed state.

The user preferably disposes the portable terminal 20 on the front cover 12 of the head mounted device 10 in a state in which the still image illustrating the lattice-shaped pattern is displayed on the display surface 21a. At this time, the portable terminal 20 is preferably disposed such that the mask 18 provided to the head mounted device 10 covers the display surface 21a. Then, the user preferably moves the front cover 12 from the open position to the closed position so that the display surface 21a is disposed in a position of facing the lens 14L and the lens 14R.

In addition, when the user disposes the portable terminal 20 on the front cover 12, the user preferably operates the portable terminal 20 in advance so as to start the photographing function of the imaging unit 22. The portable terminal 20 in a state in which the imaging function is started photographs the front of the display surface 21a in the housed state. In the present embodiment, as described above, the reflecting mirror 15 is disposed within the photographing range of the imaging unit 22. Thus, the imaging unit 22 photographs the display surface 21a via the reflecting mirror 15.

The image information obtaining section 33 determines whether or not the mark M is present in the photographing range of the imaging unit 22. Whether or not the mark M is present in the photographing range of the imaging unit 22 is, for example, preferably determined by performing image processing that recognizes the shape of the mark M by a method of pattern matching or the like.

When the image information obtaining section 33 determines that the mark M is not present in the photographing range of the imaging unit 22, the display control section 31 preferably limits the display of the moving image on the display surface 21a. This is because when the mark M cannot be recognized, there is a strong possibility that the portable terminal 20 is not disposed in an appropriate position within the head mounted device 10 and the user cannot view the moving image comfortably even when the moving image is displayed. When the mark M cannot be recognized, the display control section 31, for example, preferably makes error display or the like on the display surface 21a and warns the user that the portable terminal 20 is not disposed in an appropriate position.

In FIG. 6, a rectangular broken line CR represents the photographing range of the imaging unit 22, and a rectangular dotted line DR represents the external shape of the display surface 21a. Incidentally, while the reflecting mirror 15 is disposed such that the display surface 21a exposed from the opening 18R is present in the photographing range in the present embodiment, there is no limitation to this. The reflecting mirror 15 is preferably disposed such that at least either the display surface 21a exposed from the opening 18R or the display surface 21a exposed from the opening 18L is present in the photographing range.

When the image information obtaining section 33 determines that the mark M is present in the photographing range of the imaging unit 22, the position information obtaining section 33a obtains position information of the mark M and position information of each vertex of the lattice (which vertex will hereinafter be referred to also as a lattice point) in the imaging coordinate system.

Incidentally, the obtainment of the position information in the imaging coordinate system is preferably performed on the basis of gradation values of colors of a photographed image. In the present embodiment, a lattice pattern formed of lattice cells illustrated in black and lattice cells illustrated in white is displayed on the display surface 21a, and black is set as the color of the mask 18. The position information obtaining section 33a preferably obtains the position information of coordinates of the mark M and the position information of coordinates of each lattice point by distinguishing differences in gradation value between black parts and white parts in the image photographed by the imaging unit 22.

The position information obtaining section 33a obtains the position information of coordinates $(x_m, y_m)$ of the mark M in the imaging coordinate system and associates the imaging coordinate system and the display coordinate system with each other with the position information of the mark M as a reference. Thus, on the basis of the coordinates of a predetermined position separated by a predetermined distance from the mark M in the imaging coordinate system, the position information obtaining section 33a can obtain the coordinates of the predetermined position in the display coordinate system.

FIG. 6 illustrates an example in which the position information obtaining section 33a obtains the position information of each of lattice points Q1, Q2, Q3, Q4, and Q5 in the imaging coordinate system. Incidentally, here, the lattice points Q1, Q2, Q3, Q4, and Q5 are in a same position in the $y_c$ axis direction, and the coordinates of the lattice points Q1, Q2, Q3, Q4, and Q5 are expressed as $(x_{c1}, y_{c1})$, $(x_{c2}, y_{c1})$, $(x_{c3}, y_{c1})$, $(x_{c4}, y_{c1})$, and $(x_{c5}, y_{c1})$.

After the position information obtaining section 33a obtains the position information of the lattice points Q1, Q2, Q3, Q4, and Q5 in the imaging coordinate system, the position information obtaining section 33a transforms these pieces of position information into position information in the display coordinate system. That is, as illustrated in FIG. 7, the position information obtaining section 33a obtains position information of the coordinates $(x_{p1}, y_{p1})$, $(x_{p2}, y_{p1})$, $(x_{p3}, y_{p1})$, $(x_{p4}, y_{p1})$, and $(x_{p5}, y_{p1})$ of the lattice points Q1, Q2, Q3, Q4, and Q5 in the display coordinate system. The coordinate system transformation is, for example, preferably performed by the control unit 30 by performing operation using a transformation matrix.

Next, the position information obtaining section 33a obtains position information on an edge of the opening 18R of the mask 18 which position information has the same positions in the $x_c$ axis direction as the lattice points Q1, Q2, Q3, Q4, and Q5 in the imaging coordinate system. In addition, on the basis of these pieces of position information, the position information obtaining section 33a obtains position information on the edge of the opening 18R of the mask 18 which position information has the same positions in the $x_p$ axis direction as the lattice points Q1, Q2, Q3, Q4, and Q5 in the display coordinate system. Specifically, as illustrated in FIG. 8, the position information of each of the coordinates $(x_{p1}, y_{p11})$, $(x_{p2}, y_{p12})$, $(x_{p3}, y_{p13})$, $(x_{p4}, y_{p14})$, and $(x_{p5}, y_{p15})$ of points C1, C2, C3, C4, and C5 as reference positions is obtained. However, this is an example, and it suffices for the position information obtaining section 33a to obtain at least two pieces of position information of points on the edge of the opening 18R.

Here, because the opening 18R is in the shape of a perfect circle, all of lengths from the lattice points C1, C2, C3, C4, and C5 to the center of the opening 18R, that is, the numbers of pixels from the points C1, C2, C3, C4, and C5 to the center of the opening 18R on the display surface 21a are the same. The position information obtaining section 33a obtains position information of the center of the opening 18R in the display coordinate system on the basis of the position information of the lattice points C1, C2, C3, C4, and C5.

As described above, the center of the opening 18R and the optical axis OR of the lens 14R are on the same axis. Therefore, the position information obtaining section 33a can obtain position information of the optical axis OR of the lens 14R in the display coordinate system on the basis of the position information of the center of the opening 18R in the display coordinate system.

Incidentally, while the above description has been made of an example in which the position information of the optical axis OR is obtained by obtaining the coordinates of five lattice points, there is no limitation to this. It suffices for the number of obtained coordinates of lattice points to be at least two or more. However, the larger the number of obtained coordinates of lattice points, the higher the accuracy with which the position information of the optical axis OR can be obtained. In addition, the position information obtaining section 33a may perform processing of estimating a boundary line between the opening 18R and the display surface 21a, that is, the external shape of the opening 18R by obtaining the coordinates of all lattice points present within the photographing range. By estimating the external shape of the opening 18R, it is possible to obtain the position information of the center of the opening 18R of the mask 18, that is, the position information of the optical axis OR with higher accuracy.

Further, the position information obtaining section 33a obtains position information of two points on a line segment dividing the opening 18R in two among the coordinates on the edge of the opening 18R in the display coordinate system. FIG. 8 illustrates an example in which the coordinates of C3 $(x_{p3}, y_{p13})$ and C6 $(x_{p3}, y_{p21})$ are obtained in the display coordinate system.

The pixel number obtaining section 35 obtains a length between C3 and C6 in the display coordinate system on the basis of the position information of C3 $(x_{p3}, y_{p13})$ and C6 $(x_{p3}, y_{p21})$. That is, the pixel number obtaining section 35 obtains the number of pixels arranged between C3 and C6 on the display surface 21a. Further, the pixel density obtaining section 37 obtains pixel density in the display surface 21a on the basis of the length R of the diameter of the opening 18L and the number of pixels obtained by the pixel number obtaining section 35. Incidentally, the pixel density indicates the number of pixels per inch.

Further, the position information obtaining section 33a obtains position information of the center of the lens 14R for the right eye 1R on the basis of the position information of the center of the lens 14L for the left eye 1L. Specifically, the position information obtaining section 33a obtains the position information of the center of the opening 18L in the display coordinate system on the basis of the position information of the center of the opening 18R in the display coordinate system, the pixel density obtained by the pixel density obtaining section 37, and the length L1 between the center of the opening 18R and the center of the opening 18L, the length L1 being stored in advance. In addition, as described above, the center of the opening 18L and the optical axis OL of the lens 14L are on the same axis. The position information obtaining section 33a can therefore obtain the position information of the optical axis OL of the lens 14L in the display coordinate system on the basis of the position information of the center of the opening 18L in the display coordinate system.

The display control section 31 displays a moving image in regions of the display surface 21a which regions correspond to the position information of the optical axes OR and OL which position information is obtained by the position information obtaining section 33a. Specifically, the display control section 31 preferably displays the moving image on the display surface 21a such that the center of the moving image is positioned on the optical axes OR and OL obtained by the position information obtaining section 33a. In addition, the display control section 31 preferably displays the moving image of an appropriate size on the display surface 21a on the basis of the pixel density obtained by the pixel density obtaining section 37.

As described above, in the present embodiment, the moving image of an appropriate size can be displayed in an appropriate position and region of the display surface 21a irrespective of the performance of the portable terminal. Thus, the user can view the moving image without a feeling of strangeness even when any kind of portable terminal is housed in the HMD 100.

In the present embodiment, in order to obtain the position information of the optical axes OL and OR with higher accuracy, a still image illustrating a lattice-shaped pattern is displayed on the display surface 21a, and the position information of a plurality of lattice points is obtained. In particular, in the present embodiment, while it is difficult to obtain the position information on the display surface 21a with high accuracy because the display surface 21a is photographed obliquely, accuracy of the obtained position information of the optical axes OL and OR is ensured by using the position information of a plurality of lattice points. However, there is no limitation to this. It suffices to obtain the position information of the optical axes OL and OR on the basis of at least two reference positions whose relative positions with respect to the optical axes OL and OR are determined in advance. For example, a still image including at least one edge may be displayed on the display surface 21a, and the position information of the optical axis OR may be obtained with two points of intersection of the edge and the edge of the opening 18R of the mask 18 as reference positions.

In addition, in the present embodiment, the mask 18 is used in which the opening 18R in the shape of a perfect circle is formed. However, the opening formed in the mask 18 is not limited to the shape of a perfect circle. It suffices for the opening formed in the mask 18 to be an opening having at least a predetermined length from an edge of the opening to the center of the opening 18R.

In addition, in the present embodiment, description has been made of an example in which the pixel density is obtained by using the length R of the diameter of the opening 18R in the shape of a perfect circle and the number of pixels present on the line segment that divides the opening 18R into two equal parts. However, there is no limitation to this. It suffices to obtain the pixel density by at least obtaining an actual length on the display surface 21a and the number of pixels arranged over the length.

Incidentally, in the present embodiment, the reflecting mirror 15 is disposed such that the opening 18R of the mask 18 is included in the photographing range of the imaging unit 22. However, the reflecting mirror 15 may be arranged such that both the opening 18R and the opening 18L are included in the photographing range. It is thereby possible to obtain the position information of the optical axis OL by performing control similar to that in obtaining the position information of the optical axis OR rather than obtaining the position information of the optical axis OL on the basis of the position information of the optical axis OR.

Figure 9:
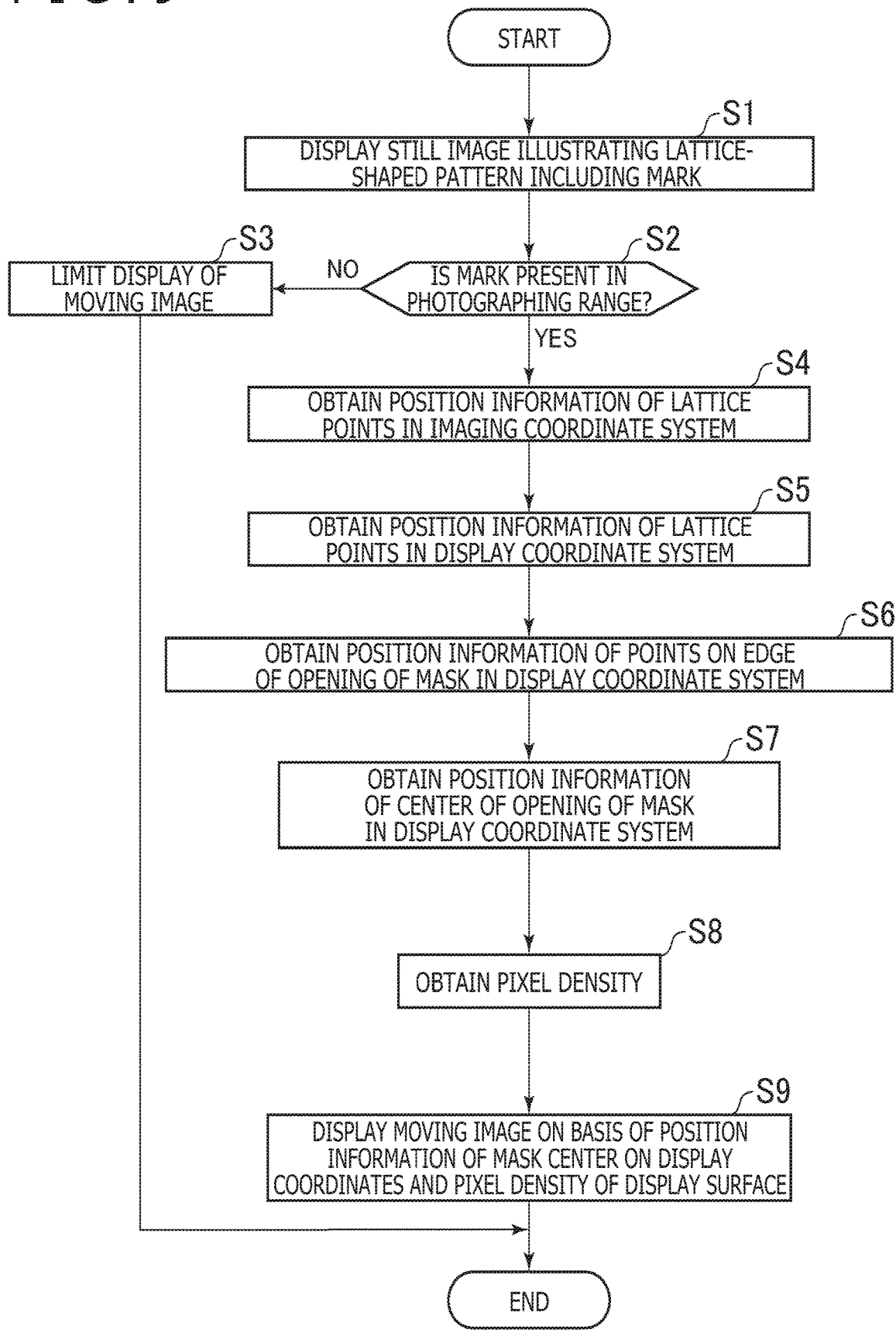
FIG. 9 is a flowchart illustrating operation of a control unit in the present embodiment.

Operation of the control unit 30 in the present embodiment will next be described with reference to FIG. 9. FIG. 9 is a flowchart illustrating operation of the control unit in the present embodiment.

First, the display control section 31 displays the still image illustrating the lattice-shaped pattern including the mark M on the display surface 21a (step S1). Next, the image information obtaining section 33 determines whether or not the mark M is present within the photographing range of the imaging unit 22 (step S2). When it is determined that the mark M is not present within the photographing range (NO in step S2), the display control section 31 limits display of a moving image (step S3).

When it is determined that the mark M is present within the photographing range (YES in step S2), the position information obtaining section 33a obtains the position information of the mark M in the imaging coordinate system and associates the imaging coordinate system and the display coordinate system with each other with the position information of the mark M as a reference. Then, the position information obtaining section 33a obtains the position information of lattice points in the imaging coordinate system (step S4). Further, the position information obtaining section 33a obtains the position information of the lattice points in the display coordinate system on the basis of the position information of the lattice points in the imaging coordinate system (step S5).

Further, the position information obtaining section 33a obtains at least two pieces of position information of points on the edge of the opening 18R of the mask 18 in the display coordinate system on the basis of the position information of the lattice points in the display coordinate system (step S6). Further, the position information obtaining section 33a obtains the position information of the center of the opening 18R of the mask 18 in the display coordinate system on the basis of the position information of the points on the edge of the opening 18R of the mask 18 in the display coordinate system (step S7).

In addition, on the basis of the position information of two points on the line segment dividing the opening 18R in two among coordinates on the edge of the opening 18R in the display coordinate system, the pixel number obtaining section 35 obtains the number of pixels arranged between the two points. Further, the pixel density obtaining section 35 obtains the pixel density of the display surface 21a on the basis of the length R of an actual diameter of the opening 18L and the number of pixels obtained by the pixel number obtaining section 35 (step S8).

Then, the display control section 31 determines a display region and a display size of the moving image and displays the moving image on the display surface 21a on the basis of the position information of the center of the opening 18R of the mask 18 in the display coordinate system which position information is obtained in step S7 and the pixel density of the display surface 21a which pixel density is obtained in step S8 (step S9).

[First Modification]

Figure 10:
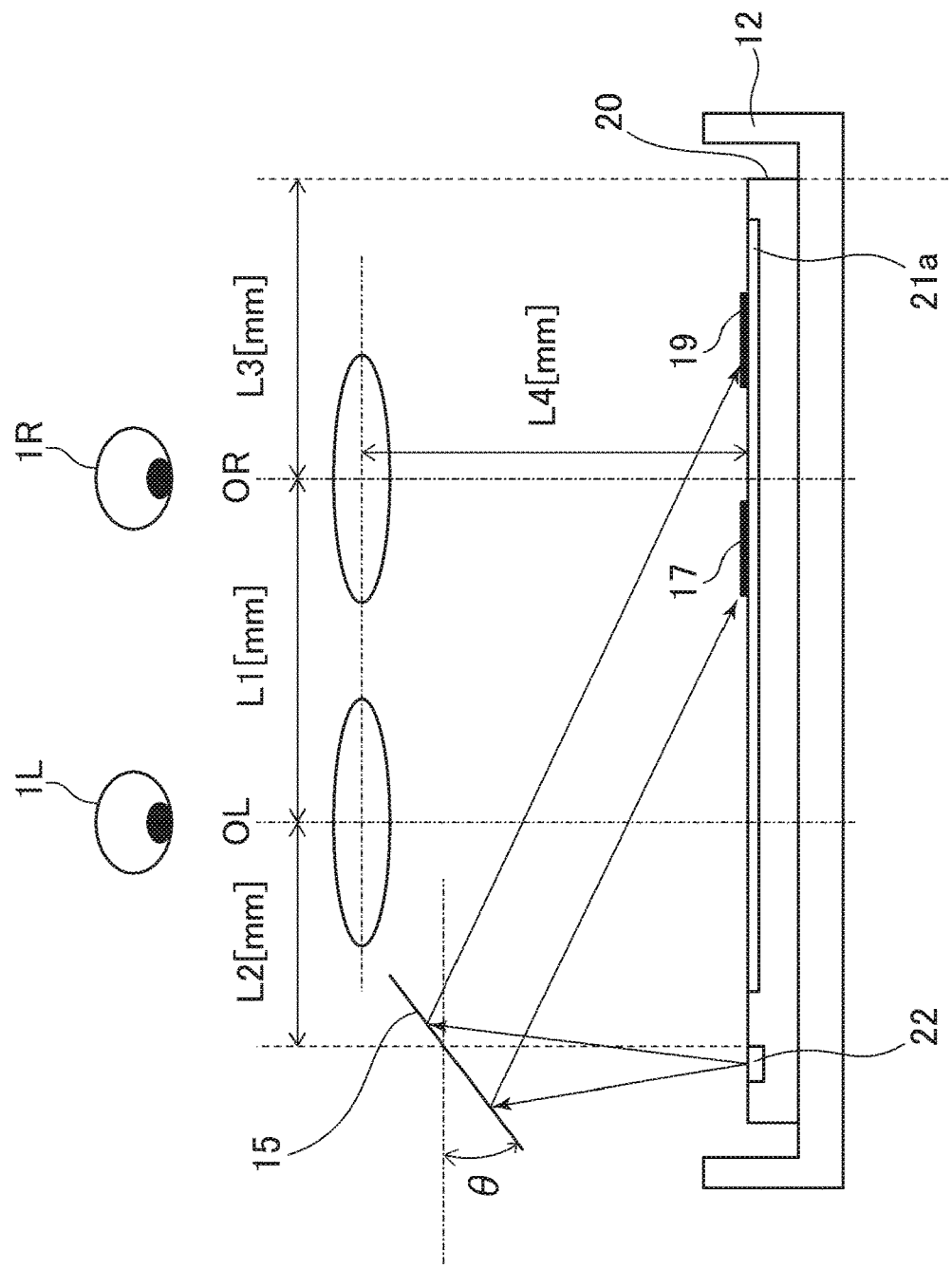
FIG. 10 is a schematic diagram schematically illustrating an example of the mounted state of a head mounted display according to a first modification of the present embodiment.
Figure 11:
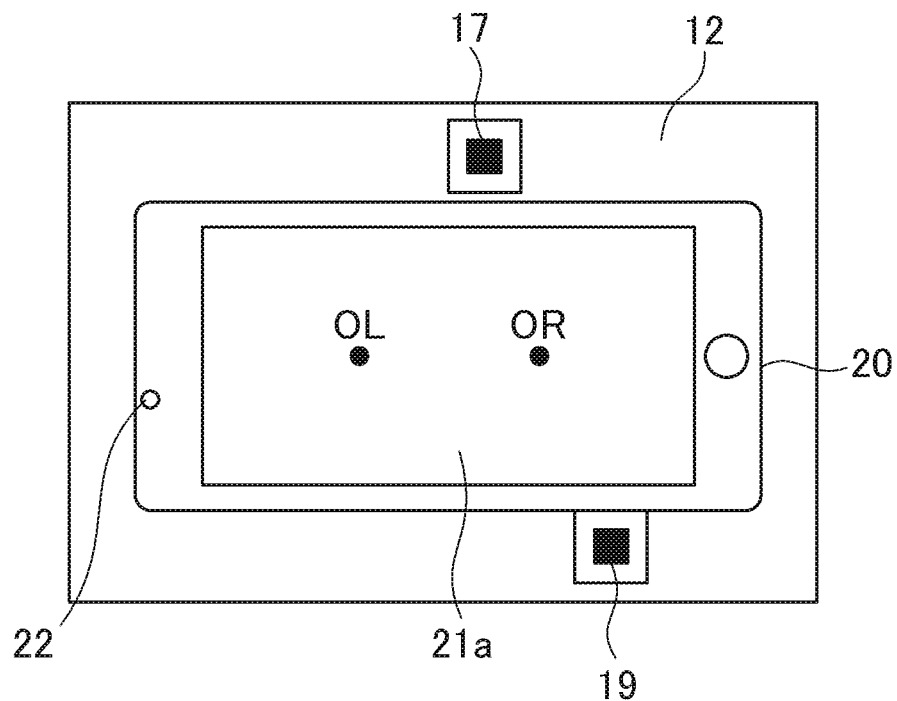
FIG. 11 is a diagram illustrating a portable terminal and vicinities thereof in a housed state in the first modification of the present embodiment.

A first modification of the present embodiment will next be described with reference to FIG. 10 and FIG. 11. FIG. 10 is a schematic diagram schematically illustrating an example of the mounted state of a head mounted display according to the first modification of the present embodiment. FIG. 11 is a diagram illustrating a portable terminal and vicinities thereof in the housed state in the first modification of the present embodiment. Incidentally, configurations similar to those illustrated in FIG. 3 are identified by the same reference signs, and description thereof will be omitted.

The first modification adopts a configuration provided with light emitting marks 17 and 19 as two reference points instead of using the mask 18 described with reference to FIG. 3, FIG. 4, and the like. The light emitting marks 17 and 19 are, for example, preferably arranged on the front cover 12 and in a vicinity of outer edges of the portable terminal 20. In addition, the light emitting marks 17 and 19 are preferably arranged in the photographing range of the imaging unit 22 via the reflecting mirror 15. In addition, the light emitting marks 17 and 19 preferably emit light by receiving the image light from the display surface 21a or are self-luminous so as to be recognized by the image information obtaining section 31.

In addition, the relative positions of the light emitting marks 17 and 19 with respect to the optical axis OR of the lens 14R are preferably determined in advance. That is, actual lengths from the light emitting marks 17 and 19 to the optical axis OR are preferably determined in advance. In addition, an actual length from the mark 17 to the mark 19 is preferably determined in advance. Then, the control unit 30 preferably stores, in advance, information regarding the actual lengths from the light emitting marks 17 and 19 to the optical axis OR and the actual length from the mark 17 to the mark 19.

The position information obtaining section 33a obtains the position information of the light emitting marks 17 and 19 in the imaging coordinate system. Then, the position information obtaining section 33a associates the imaging coordinate system and the display coordinate system with each other with the position information of the light emitting marks 17 and 19 in the imaging coordinate system as a reference. Then, the position information obtaining section 33a obtains the position information of the light emitting marks 17 and 19 in the display coordinate system on the basis of the position information of the light emitting marks 17 and 19 in the imaging coordinate system.

Further, the pixel number obtaining section 35 obtains a length from the light emitting mark 17 to the light emitting mark 19 in the display coordinate system on the basis of the position information of the light emitting mark 17 in the display coordinate system and the position information of the light emitting mark 19 in the display coordinate system. That is, the pixel number obtaining section 35 obtains the number of pixels arranged between the light emitting mark 17 and the light emitting mark 19. Further, the pixel number obtaining section 35 obtains the pixel density of the display surface 21a on the basis of the number of pixels obtained by the pixel number obtaining section 35 and the actual length from the light emitting mark 17 to the light emitting mark 19.

Further, the position information obtaining section 33a obtains the position information of the optical axis OR in the display coordinate system on the basis of the position information of the light emitting marks 17 and 19 in the display coordinate system, the pixel density of the display surface 21a, and the actual lengths from the light emitting marks 17 and 19 to the optical axis OR.

In addition, the position information obtaining section 33a obtains the position information of the optical axis OL in the display coordinate system on the basis of the pixel density of the display surface 21a, the position information of the optical axis OR in the display coordinate system, and the length L1. Then, the display control section 31 displays a moving image of an appropriate size in appropriate positions and regions of the display surface 21a on the basis of the position information of the optical axes OR and OL in the display coordinate system.

[Second Modification]

Figure 12:
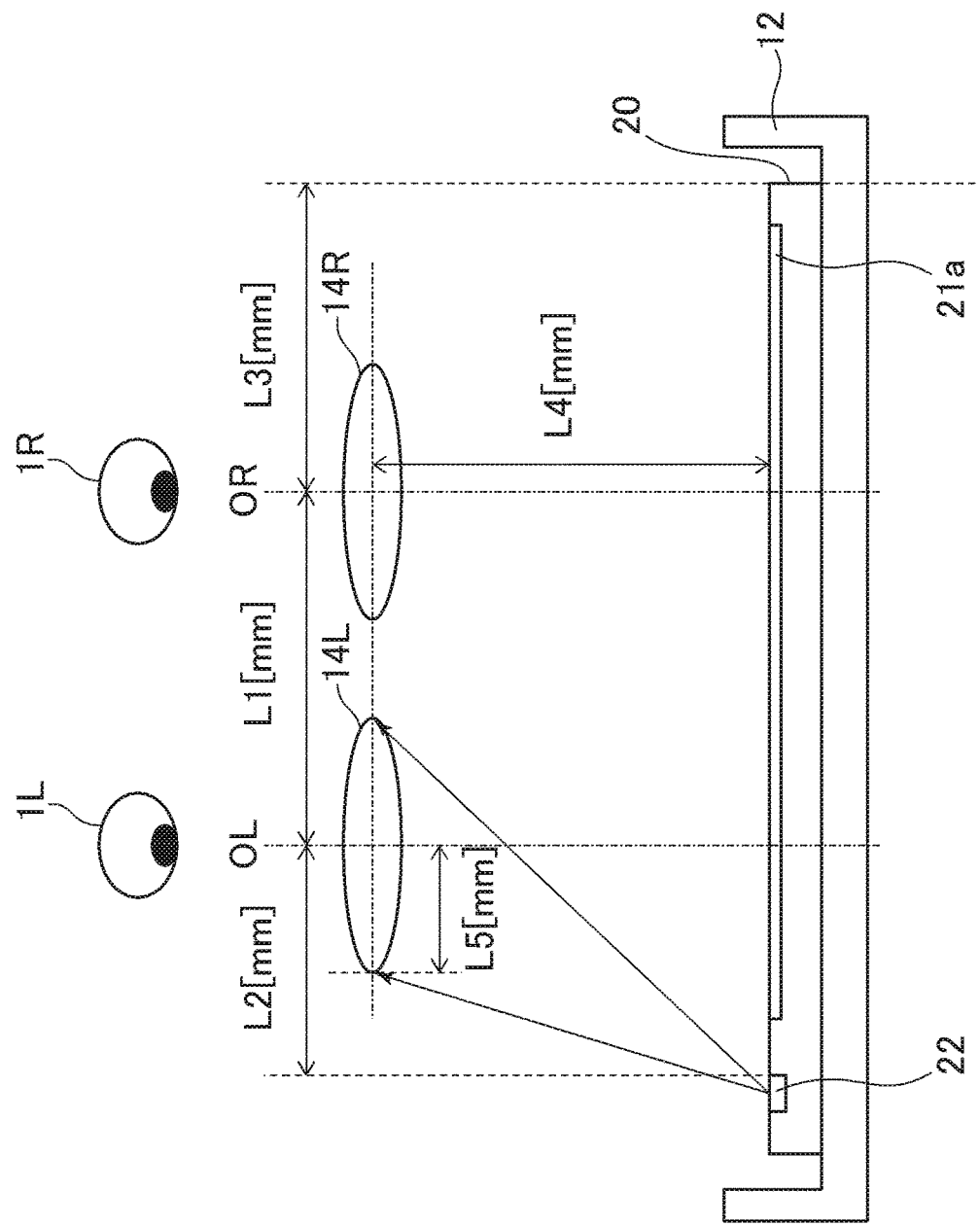
FIG. 12 is a schematic diagram schematically illustrating an example of the mounted state of a head mounted display according to a second modification of the present embodiment.

A second modification of the present embodiment will next be described with reference to FIG. 12. FIG. 12 is a schematic diagram schematically illustrating an example of the mounted state of a head mounted display according to the second modification of the present embodiment.

In the second modification, description will be made of an example in which the position information of the optical axes OR and OL is obtained without the use of the mask 18 and the reflecting mirror 15 illustrated in FIG. 3 or the light emitting marks 17 and 19 illustrated in FIG. 11.

In addition, in the second modification, the control unit 30 preferably stores the pixel density of the display surface 21a in advance. That is, the second modification is targeted at a portable terminal 20 in which the pixel density of the display surface 21a is known in advance.

In the second modification, the lens 14L is preferably disposed in the photographing range of the imaging unit 22. First, the imaging unit 22 photographs an edge of the lens 14L which edge has a relative position determined in advance with respect to the optical axis OL of the lens 14L. In the second modification, the shape of the lens 14L is the shape of a perfect circle, and the length of the radius of the lens 14L is set to be L5. The control unit 30 preferably stores information regarding the length L5 of the radius of the lens 14L in advance.

Then, the position information obtaining section 33a obtains position information of at least two points on the edge of the lens 14L in the display coordinate system as the position information of reference positions. Then, the position information obtaining section 33a obtains the position information of the optical axes OL and OR in the display coordinate system on the basis of the position information of at least two reference positions in the display coordinate system, the pixel density of the display surface 21a which pixel density is stored in advance, and the length L5 of the radius of the lens 14L which length is stored in advance. Then, the display control section 31 displays a moving image of an appropriate size in appropriate positions and regions of the display surface 21a on the basis of the position information of the optical axes OL and OR in the display coordinate system.

Incidentally, in the second modification, at least two marks serving as reference positions are preferably provided on the edge of the lens 14L, and the position information obtaining section 33a preferably obtains the position information of the marks. However, there is no limitation to the provision of the marks on the edge of the lens. It suffices to set, as reference positions, positions that are certain positions in the head mounted device 10 and whose relative positions with respect to the optical axis of the lens are determined in advance.

Incidentally, in the present embodiment and the modifications thereof, description has been made of an example in which various kinds of processing are performed by the application program stored in the memory of the portable terminal 20. However, there is no limitation to this. For example, the various kinds of processing may be performed by an external server device capable of data communication with the portable terminal 20 or the like in a display system used for the head mounted display including the head mounted device 10 and the portable terminal 20.

REFERENCE SIGNS LIST

10 Head mounted device, 20 Portable terminal, 21a Display surface, 22 Imaging unit, 31 Display control section, 33 Image information obtaining section, 33a Position information obtaining section, 100 Head mounted display.

The invention claimed is:

1. A display system used for a head mounted display including a head mounted device having an optical system for guiding image light to an eye of a user and configured to be mounted on a head of the user and a portable terminal having an imaging unit for photographing a front of a display surface and capable of being housed in the head mounted device, the display system comprising:
a display control section configured to display a moving image on the display surface;
an image information obtaining section configured to obtain image information photographed by the imaging unit; and
a position information obtaining section configured to obtain position information of an optical axis of the optical system on the display surface on a basis of position information of at least two reference positions whose relative positions with respect to the optical axis are determined in advance, the at least two reference positions being included in the image information;
the display control section displaying the moving image in a region of the display surface according to the position information of the optical axis.

2. The display system according to claim 1, wherein
the display control section displays a still image including at least one edge on the display surface, and
the position information obtaining section obtains the position information of the optical axis by using, as the two reference positions, at least two points of intersection of an edge of an opening formed in a region including at least the optical axis in a covering member covering the display surface in a state in which the portable terminal is housed in the head mounted device and the at least one edge.

3. The display system according to claim 2, wherein
the covering member is disposed such that a center of the opening coincides with the optical axis.

4. The display system according to claim 2, further comprising:
a pixel number obtaining section configured to obtain the number of pixels present between edges of the opening in the display surface; and a pixel density obtaining section configured to obtain a pixel density of the display surface on a basis of the number of pixels and a length between the edges of the opening, wherein the display control section displays the moving image on the display surface on a basis of the pixel density.

5. The display system according to claim 1, wherein the display control section displays a still image including a predetermined mark on the display surface, and the position information obtaining section obtains position information of the mark and associates an imaging coordinate system on a light receiving surface of the imaging unit and a display coordinate system on the display surface with each other on a basis of the position information of the mark.

6. The display system according to claim 5, wherein the image information obtaining section determines whether or not the mark is present within a photographing range of the imaging unit on a basis of the image information, and, when the image information obtaining section determines that the mark is not present within the photographing range of the imaging unit, the display control section limits the display of the moving image.

7. The display system according to claim 1, wherein the display control section displays a still image including a predetermined mark on the display surface, the imaging unit obtains image information of the mark, and the position information obtaining section associates an imaging coordinate system in the image information and a display coordinate system on the display surface with each other on the basis of position information of the mark.

8. The display system according to claim 1, wherein the display system includes the head mounted device having at least one reflecting mirror configured to reflect the image light and guide the image light to the imaging unit.

9. The display system according to claim 1, wherein the display system includes the head mounted device including at least two light emitting marks whose relative positions with respect to the optical axis are determined in advance, and at least one reflecting mirror configured to reflect light of the light emitting marks and guide the light to the imaging unit.

10. The display system according to claim 1, wherein the position information obtaining section obtains the position information of the optical axis by using a part of the head mounted device as the two reference positions.

11. The display system according to claim 1, wherein the position information obtaining section obtains the position information of the optical axis by using, as the two reference positions, positions on an edge of a lens included in the optical system.

12. A display method comprising:
by a computer,
displaying a moving image on a display surface;
obtaining image information photographed by an imaging unit for photographing a front of the display surface;
obtaining position information of an optical axis of an optical system on the display surface, the optical system being included in a head mounted device configured to be mounted on a head of a user, and the optical system guiding image light of the moving image to an eye of the user, on a basis of position information of at least two reference positions whose relative positions with respect to the optical axis are determined in advance, the at least two reference positions being included in the image information; and
displaying the moving image in a region of the display surface according to the position information of the optical axis.

13. A head mounted device comprising:
a mounting band configured to be mounted on a head of a user;
a housing portion configured to house a portable terminal having an imaging unit for photographing a front side of a display surface displaying a moving image;
an optical system configured to guide image light emitted from the display surface to an eye of the user; and
at least one reflecting mirror configured to reflect the image light to the imaging unit.

14. The head mounted device according to claim 13, further comprising:
a covering member covering the display surface and having an opening formed in a region including at least the optical axis in a state in which the portable terminal is housed in the housing portion.

* * * * *